United States Patent
Hara et al.

[11] 3,711,126
[45] Jan. 16, 1973

[54] COUPLING FOR MILLI-WAVE GUIDING TUBE

[75] Inventors: Atsushi Hara; Hisao Naganuma; Akio Takai, all of Kawasakishi, Japan

[73] Assignee: Nippon Kokan Kabushiki Kaisha, Tokyo, Japan

[22] Filed: Nov. 23, 1970

[21] Appl. No.: 91,791

[30] Foreign Application Priority Data

Nov. 24, 1969 Japan ...................44/93648

[52] U.S. Cl. ............285/116, 285/39, 285/356, 285/369, 333/98 R
[51] Int. Cl. ............................................F16l 19/00
[58] Field of Search..........285/369, 115, 89, 92, 356, 285/355, 390, 116; 333/98 R

[56] References Cited

UNITED STATES PATENTS

| | | | |
|---|---|---|---|
| 3,500,264 | 3/1970 | Floyd | 333/98 R |
| 3,560,029 | 2/1971 | Floyd | 333/98 R |
| 318,356 | 5/1885 | Cogan | 285/369 X |
| 2,070,084 | 2/1937 | Key | 285/390 X |
| 255,734 | 3/1882 | Moore | 285/356 X |
| 1,899,469 | 2/1933 | Mecom et al. | 285/356 X |
| 129,691 | 7/1872 | Tasker | 285/116 |
| 1,202,196 | 10/1916 | Lewis | 285/356 X |
| 2,468,783 | 5/1949 | Schwartz | 285/356 X |

Primary Examiner—Thomas F. Callaghan
Attorney—Linton & Linton

[57] ABSTRACT

The invention relates to a coupling for milli-wave guiding tube, and is to form respectively the connecting surfaces between the wave guiding tube screwed on the coupling sleeve and this coupling sleeve, as well as form the respective connecting surfaces between the said wave guiding tube and the junk ring screwed on the both ends of this coupling sleeve and furnished with the packing to serve as sealing between the outer surface of the wave guiding tube and the inner surface of the connecting sleeve, thereby obtaining not only a suitable connecting strength and the complete airtightness of the respective connected milli-wave guiding tubes but also the high precision of alignment in order to provide a high working efficiencies.

1 Claim, 3 Drawing Figures 3,711,126

COUPLING FOR MILLI-WAVE GUIDING TUBE

BRIEF EXPLANATION

The invention relates to a coupling for milli-wave guiding tube which is arranged in the ground or in the air for transmitting an electric mill-wave therethrough.

As milli-wave guiding tubes, a conventional tube has been proposed in its own way, the inner diameter of which is usually about 10 – 60mm$\phi$, and there are two kinds of a plated wave guiding tube applied with copper plating and further resin lining in the inner surface thereof, and of a spiral wave guiding tube winding a wire around the inner surface thereof. In such a wave guiding tube, gas of about 1 Kg/cm² is sealed and communication is carried out by transmitting a milli-wave, but it is apparent that not only unevennesses and bendings of the inner surface of the tube but also warps and foldings of a core of the tube in the coupling cause a bad influence upon the characteristics of wave communication. Therefore, in the case of transmitting with the use of such a wave guiding tube, in order not to lower the characteristics of the wave communication, the strict particulars are set in connection with the tolerances such as stagger of the tube core at the coupling portion, a bending amount at the time of connecting the coupling in the straight lined condition or a bending amount at the time of bending the tube at 30m of radius of curvature. Accordingly, there are various devices for satisfying these particulars in the coupling for wave guiding tubes, but such device have many shortcomings, for instance, it is considerably difficult to provide a high precise alignment with a tolerance of less 5mm, and the structure is very complicated, bringing about not easy manufacturings, insufficient working efficiencies for connection, taking expensive cost. That is, the first of them according to the foregoing arts is a butted flanged type. This type is available for airtightness and prevention from warp of the core, but the outer diameter thereof becomes so larger that a plurality of pipings cannot be provided on one pit or a stand and it cannot be put in a practical use. The second is a screw type and this has a long flat processing parts, so that when it is practically used, even if slight dust is adhered on the tube body, nibbles are caused on the tube body and a sleeve to lower the working efficiency and result in insufficient airtightness. The third is a caulking type or a spring type, and this has a merit in its own way, but has a shortcoming in the workings of connecting. In order to mitigate these shortcomings, the fourth coupling is proposed with the use of an o-ring. This type is to screw the tube with the coupling sleeve and thereafter the o-ring temporarily placed outside of the coupling is pushed thereinto with a driver-shaped jig. This coupling may be said as a comparatibely good one, but in the case of pushing the o-ring thereinto with said jig, some flaw is made on the o-ring or the o-ring cannot always precisely set, and in either case, it has faults in airtightness.

The invention has studied to remove disadvantages or faults in the foregoing arts. The fundamental object of the invention is to not only maintain a perfect airtightness by sealing gas into the tube to provide a preferable strength of the mechanical connection, but also obtain a high precise alignment which is always kept within said tolerance and besides heighten the working thereof.

For such a purpose, the invention is to provide an engagement of the sleeve and the wave guiding tube as well as is to respectively form connecting surfaces between the thus connected wave guiding tube and the sleeve, and between the said wave guiding tube and the junk ring inserting the packing onto the end of this sleeve. The respective wave guiding tubes are, after all, being set as automatically making alignments on these two connecting surfaces. Especially by screwing said junk ring an alignment is justly set and an airtightness is perfectly formed by compressing the packing. The connecting operation therefor is easily performed by mounting the junk ring onto the outside of the wave guiding tube and after then opposing the end portions of the wave guiding tubes and rotating the sleeve. Only with the screwing of the junk ring to the sleeve the desired alignment and the sealing relation are completed to accomplish the connecting purpose, and the operation therefor is enough with a simple screwing, being very easy in comparison with the prior arts.

Another object exists in obtaining a coupling for the wave guiding tube of a miniaturized structure having the above characteristics. According to the invention, the sleeve and the junk ring are so small that the comparatively simple cylindrical or ring bodies are mounted on the outer surface of the wave guiding tube. That the coupling portion is thus miniaturized implies that protecting tube which is further arranged on the outer of this wave guiding tube is made to have a small diameter and all of the processings are made easy which is of course fairly significant.

Other characteristics and actual composing relationship according to the invention will be apparant from the following explanations and the accompanying drawings.

DETAILED EXPLANATION

Figure 1:
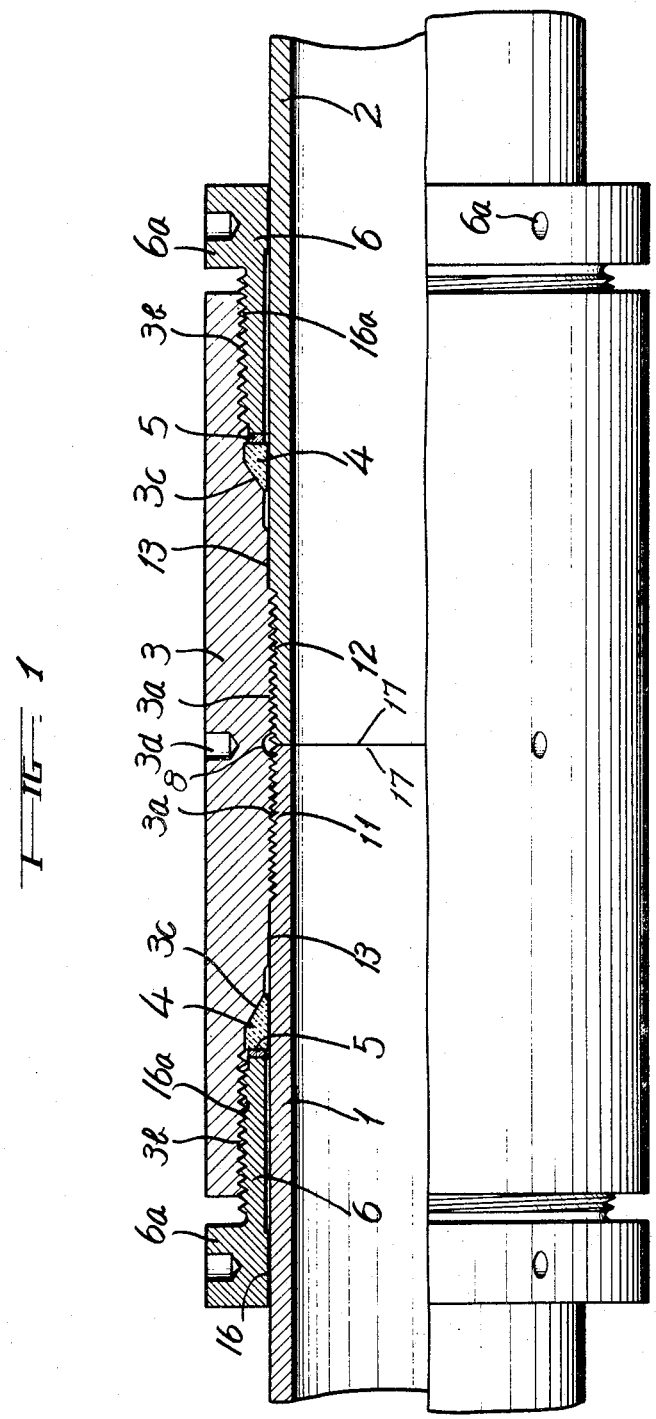
FIG. 1 is the side view, partially in section, showing the condition of connecting the milli-wave guiding tube with the coupling of the invention.
Figure 2:
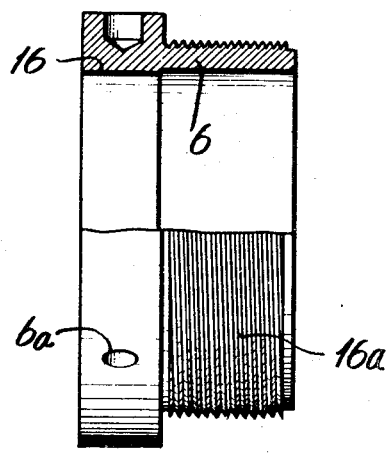
FIG. 2 is the side view, partially in section, of the junk ring for the above.

To explain the invention with referrance to the accompanying drawings, connecting end outer peripheries of milli-wave guiding tubes 1 2 of the circular cross-section to be connected are symmetrically cut with screws 11 12 in the opposite directions, i.e., to the right and left sides of relief of screw 8 respectively, and a coupling sleeve 3 is coupled to female screws 3a 3a formed at an inner central portion of the coupling sleeve to the screws 11 12. Tapered portions 3c are formed at both ends of said coupling sleeve 3 respectively, and another female screw 3b is also provided, and a packing 4 is inserted between said tapered portion 3 and the wave guiding tube 1 or 2, together with compression sealing the packing 4 by screwing a junk ring 6 coupled to said female screw 3b with a male screw 16a through a backup ring 5, and connecting surfaces 13 16 of a certain width to the wave guiding tube 1 or 2 are respectively formed between the female screw 3a and the tapered portion 3c and at the outer end portion of the junk ring 6.

Figure 3:
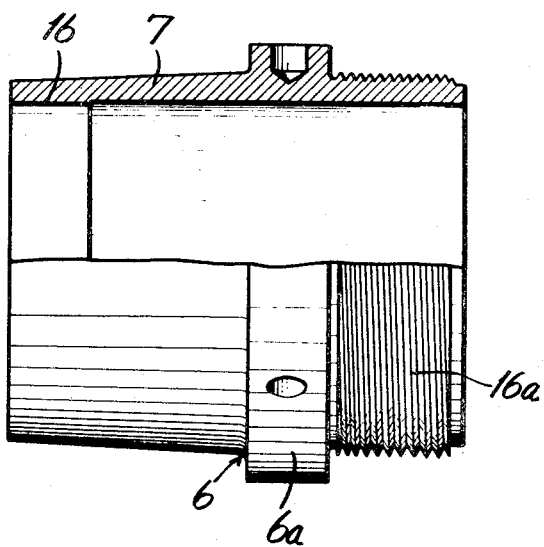
FIG. 3 is the side view of said junk ring, partially in section, in the same shown in FIG. 2, particularly designed for a strong bent passage.

FIG. 3 shows a slightly modified shape of the above described junk ring in accordance to the case of effecting a particularly strong bending, wherein a flared like extending portion 7 is further formed from its operating portion 6a to the outside and in the outer end inner surface of the extending portion 7 is formed a desired number of the connecting surfaces 16 to the outer surface of said wave guiding tube.

According to the soupling for the wave guiding tube of the invention, the wave guiding tubes 1 2 are screwed into the coupling sleeve 3 and after then the junk ring 6 is screwed into the packing 4 and the back-up ring 5 inserted into the taper portion 3c, thereby compressing the packing 4 and effecting perfect sealing, and the wave guiding tubes 1 2 are screwed as mentioned to connect to said connecting surface 13 which has been precisely processed and in this manner the cores of the both wave guiding tubes 1 2 are exactly matched with each other and any warp can be restrained to less than 0.05mm, and a clearance with the outer diameter of the tube is made lesser by the connecting surface 13 having an appropriate width (for instance, 15mm or more) of the junk ring 6 screwed as described above makes clearance with the outer diameter of the tube, thereby considerable reducing the bending at the portion of the coupling of the both wave guiding tubes 1 2 so as to form a very effective connection state as a coupling for a wave guiding tube. The ends 17 17 of the both tubes 1 2 are connected in the sleeve corresponding to the said relief 8, and as the invention secures the alignment this part is connected with the smooth surface. In this connection, the case of using the junk ring 6 as illustrated in FIG. 3, almost no bending is caused at 30m of radius of curvature. The coupling sleeve 3 and each junk ring 6 are applied with offset spanner for small holes of the operating portions 3d 6a for obtaining a smooth rotating operation.

According to the coupling for the wave guiding tube of the invention as described above, by screwing each wave guiding tube into the coupling sleeve, the core alignment can be automatically made with the connecting surface 13, and by setting the junk ring, the packing is so compressed that an entire airtightness is formed and the bending added to the passage with the connecting surface 16 of said junk ring is precisely prevented at the coupling portion, and the wave communication characteristics at the coupling portion is completely avoided from its lowering therefore, with the simple and easy operation, the invention has an excellent function and effect, such as working efficiency and brings industrially very effectiveness.

What is claimed is:

1. A coupling for a milli-wave guiding tube comprising a pair of wave guiding tubes having opposing ends in abutting relationship, each of said tubes having threaded peripheral end portions at said ends with the threads of both tubes being threaded in a reverse direction to one another, a coupling sleeve having threads on the inner central portion thereof each in threaded engagement with one of said tube threads, a pair of tapered sections on said inner portion thereof each on an opposite side of said coupling threads and further threads provided on the end sections of said inner portion, with the threads of each end section being threaded in a reverse direction to each other, packing rings each positioned in one of said sleeve tapered portions and around one of said tubes, and a pair of junk rings each encircling one of said tubes, having a threaded end in threaded engagement with a different one of said sleeve inner end portion threads and an end bearing against a different one of said packing rings back-up rings each surrounding a different one of said tubes between corresponding ones of said packing rings and said junk rings, said coupling sleeve inner portion having smooth surfaces contacting with outer surfaces of said wave guiding tubes between said sleeve tapered portions and first threads, and said junk rings having smooth surfaces contacting outer surfaces of said wave guiding tubes.

* * * * *